United States Patent Office 3,311,599
Patented Mar. 28, 1967

3,311,599
SELECTED N,N-BIS (PERFLUOROALKYL) AMINO-
ETHYLENES AND POLYMERS THEREOF
Frank Shumate Fawcett, Wilmington, Del., assignor to
E. I. du Pont de Nemours and Company, Wilmington,
Del., a corporation of Delaware
No Drawing. Filed June 17, 1963, Ser. No. 288,461
20 Claims. (Cl. 260—87.5)

This invention relates to, and has as its principal objects provision of, a new class of fluoroalkylaminoethylenes having unusual properties and polymers of the same.

The novel compounds of this invention are the N,N-bis-(perfluoroalkyl)aminoethylenes having the general formula $(R_f)_2NCX'=CXX'$ wherein each $R_f$, which can be the same or different, is perfluoroalkyl of up to 6 carbon atoms, X is hydrogen or fluorine, X' is hydrogen, fluorine, chlorine or $(R_f)_2N-$, with the provisos that the two $R_f$ substituents and the two X' substituents need not be, respectively, the same, and that not more than one X' is $(R_f)_2N-$.

Among the unusual properties possessed by the N,N-bis(perfluoroalkyl)aminoethylenes is their hydrolytic stability. These compounds are not hydrolyzed readily by water as are the known N,N-bis(alkyl)aminoethylenes having halogens on the vinyl group. The products of this invention can also be polymerized to homopolymers and to copolymers with one or more other polymerizable ethylenic compounds. The polymers, both homopolymers and copolymers, of the N,N-bis(perfluoroalkyl)aminoethylenes are also part of this invention.

The N,N-bis(perfluoroalkyl)aminoethylenes can be prepared by various methods. One method involves the addition of a N-chlorobis(perfluoroalkyl)amine to an acetylene to form the N,N-bis(perfluoroalkylamino)-ethylene directly. For example, the addition of N-chlorobis(trifluoromethyl)amine to acetylene at a temperature of 150–175° C. under autogenous pressure gives N-(2-chlorovinyl)bis(trifluoromethyl)amine.

Another method involves a two-step process. In the first step a N-chlorobis(perfluoroalkyl)amine is added to ethylene at a temperature of 150° C., under autogenous pressure, to form N-(2-chloroethyl)bis(perfluoroalkyl)-amine as illustrated by the following equation:

(1)
$(CF_3)_2NCl + CH_2=CH_2 \xrightarrow{150°\ C.} (CF_3)_2NCH_2CH_2Cl$

The resulting N-(2-chloroethyl)bis(perfluoroalkyl)amine is then dehydrochlorinated. This can be done by either of two methods, (a) by treatment with aqueous alcoholic potassium hydroxide, or (b) by heating at 650° C. for a few seconds contact time over a nickel surface, to form the N,N-bis(perfluoroalkyl)aminoethylene as illustrated by the following equations:

(2)
$(CH_3)_2NCH_2CH_2Cl + KOH \xrightarrow{Aq.\ Alc.} (CF_3)_2NCH=CH_2$ (3)
$(CF_3)_2NCH_2CH_2Cl \xrightarrow[Ni]{650°\ C.} (CF_3)_2NCH=CH_2$ A third method, also a two-step process, for preparing the products of this invention, involves addition of a N-chlorobis(perfluoroalkyl)amine to ethylene, or a substituted ethylene, in the presence of U.V. light as the first step. This reaction is illustrated by the equation:

(4)
$(CF_3)_2NCl + CHF=CF_2 \xrightarrow{U.V.} (CF_3)_2NCHFCF_2Cl$
$+$
$(CF_3)_2NCF_2-CFHCl$ The resulting isomeric mixture of N-(haloethyl)bis(perfluoroalkyl)amines is then dehydrohalogenated by a method similar to (a) described above, i.e., by treatment with powdered potassium hydroxide in a hydrocarbon reaction medium, or the mixture is dehalogenated, e.g., by heating at 550° C. over a nickel surface. These two methods are illustrated by the following equations:

(5)
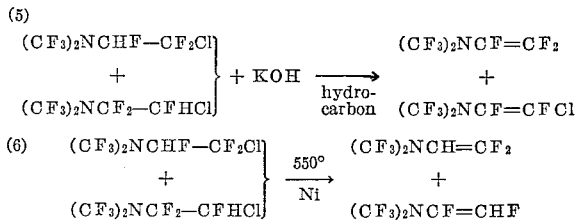

(6) $(CF_3)_2NCHF-CF_2Cl$
$+$ $\xrightarrow[Ni]{550°}$ $(CF_3)_2NCH=CF_2$
$(CF_3)_2NCF_2-CFHCl$ $(CF_3)_2NCF=CHF$ The N-chlorobis(perfluoroalkyl)amines used as starting materials for the preparation of the products of this invention can be prepared by various methods. Thus, N-chlorobis(trifluoromethyl)amine can be prepared from bis(trifluoromethyl)amine and chlorine under anhydrous conditions as described in U.S. Patent 3,052,723. Other N-chlorobis(perfluoroalkyl)amines can be prepared by chlorination of N-trifluoromethyl-N-perfluoroethylamine and higher bis(perfluoroalkyl)amines prepared in turn from the appropriate perfluoroazomethines or imines, having a C=N group, by reaction with hydrogen fluoride in accordance with the method described in U.S. Patent 2,643,267. An alternative method for preparing the N-chlorobis(perfluoroalkyl)amine starting materials consists in reaction of mercuric fluoride with a perfluoroazomethine to form a bis-mercury derivative followed by reaction of the latter with chlorine as described by Young, Tsoukalas and Dresdner, J. Am. Chem. Soc., 80, 3604 (1958).

The N,N-bis(perfluoroalkyl)aminoethylenes can be polymerized to colorless, solid polymers by bulk or solution polymerization, alone or in the presence of one or more polymerizable ethylenic compounds, at moderately elevated temperatures in the presence of free radical liberating initiators. For example, N-vinylbis(trifluoromethyl)amine polymerizes in the presence of dinitrogen difluoride at 50–60° C. under 3,000 atm. pressure to a colorless, solid polymer which is moldable at 100–150° C. into stiff, clear, transparent, tough films. Copolymers are prepared by copolymerizing a mixture of the N,N-bis (perfluoroalkyl)aminoethylene with one or more other polymerizable ethylenic compounds, e.g., ethylene, under similar conditions. The N-(trifluorovinyl)bis(trifluoromethyl)amine and ethylene form a copolymer when treated with dinitrogen difluoride at 60° C. under 3,000 atm. pressure.

The products of this invention are illustrated in greater detail by the following examples in which the proportions of ingredients are expressed in parts by weight unless otherwise specified.

EXAMPLE 1

*Preparation of N-vinylbis(trifluoromethyl)amine*

A. A mixture of 20 g. of N-chlorobis(trifluoromethyl) amine and 6 g. of ethylene is placed in a 240 ml. shaker tube lined with the corrosion-resistant alloy known as "Hastelloy" and is heated at 100° C. for 2 hours, 125° C. for 2 hours and 150° C. for 4 hours. The volatile reaction product that is formed is collected in an evacuated cylinder and it amounts to 20 g. Distillation of this product gives 11.4 g. (50% conversion) of colorless 1:1 adduct, N-(2-chloroethyl)bis(trifluoromethyl)amine, B.P. 28–30° C./143 mm., $n_D^{24}$ 1.3203. The fluorine nuclear magnetic resonance spectrum shows a single resonance in the $CF_3N-$ region and the proton magnetic resonance spectrum shows a peak for $CH_2$.

*Analysis.*—Calcd. for $C_4F_6H_4NCl$: C, 22.3%; H, 1.87%; F, 53.0%; N, 6.52%; Cl, 16.5%. Found: C, 22.83%; H, 2.25%; F, 52.49%; N, 6.36%; Cl, 17.09%.

B. A pyrolysis tube, consisting of an "Inconel" tube ⅜ in. in inside diameter and 6 in. long packed with nickel gauze and with the packed section heated by means of an electric heater, is connected directly to a gas chromatographic column (¼-in. diameter and 12 ft. long, packed with the ethyl ester of the acid known commercially as Kel–F Acid 8114 on firebrick and operated at 50° C.) Provision is made for collecting samples of the gas stream at the times when material is being eluted from the chromatographic column. With the pyrolysis tube heated at 650° C., a stream of helium at a rate of 60 ml./min. is passed through the tube and then into the gas chromatographic column. N-(2-chloroethyl)bis(trifluoromethyl)amine (20 microliters of liquid) is introduced by means of a hypodermic needle into the gas stream which carries the reactant through the heated zone and the pyrolysis products are delivered to the gas chromatographic column. A sample of the material eluted at 4.2 min. after injection time is collected and found by mass spectrometric analysis to be N-vinylbis(trifluoromethyl)amine, $(CF_3)_2N-CH=CH_2$.

EXAMPLE 2

*Preparation of N-vinylbis(trifluoromethyl)amine*

A. A 5-l. "Pyrex" flask fitted with a test tube-shaped quartz well containing a coiled mercury resonance lamp and connected to an open-end mercury-in-glass manometer is evacuated and there is introduced 2 g. of ethylene (pressure increment 326 mm.) and 11 g. of N-chlorobis(trifluoromethyl)-amine (pressure increment 223 mm.). The reactor is shielded and the lamp is turned on for a total of 5 minutes in 30-second intervals with a 1.5 minute dark period between each light period. During this time the pressure in the reactor falls rapidly and a colorless liquid collects in the bottom of the reactor. Further irradiation for 3 minutes gives only a small reduction in pressure, and no further change is observed during an additional 5-minute irradiation period. Distillation of the liquid reaction product recovered from the reactor gives 11 g. (85% conversion) of N-(2-chloroethyl)bis(trifluoromethyl)amine, B.P. 71–73° C. This product is identified by infrared and nuclear magnetic resonance spectra.

B. To a solution of 15 g. of potassium hydroxide in 15 ml. of water is added 45 ml. of ethanol and the resulting mixture containing two liquid layers is heated under reflux with stirring while the condenser water is maintained at 32–34° C. The upper end of the condenser is connected to a trap cooled by solid carbon dioxide. During a period of 20 minutes there is added 15 g. of N-(2-chloroethyl)bis(trifluoromethyl)amine $$[(CF_3)_2NCH_2CH_2Cl]$$

The temperature of the refluxing mixture falls from 80° to 66° C. during this time, and 2 ml. of condensate collects in the trap. Refluxing and stirring are continued and after one hour the temperature rises to 80° C., no solid is present in the reaction vessel, and 7.7 ml. of condensate has collected in the trap. Distillation of the volatile product with a spinning band column gives a central fraction boiling at 20–22° C. of N-vinylbis(trifluoromethyl)amine amounting to 6 g. (50% conversion). Additional product boiling at 20–22° C. and amounting to 3 g. (25% conversion) is isolated from the other fractions. Analytical gas chromatography shows the larger fraction to contain one major component (96 area percent) and purification by preparative gas chromatography yields 5 g. of purified product. The infrared absorption spectrum (gas) shows bands at 3.18 and 3.26 microns (=CH), 6.04 microns (C=C), and strong CF absorption. The fluorine nuclear magnetic resonance spectrum shows a single peak corresponding to $CF_3$ and the proton nuclear magnetic resonance spectrum shows the presence of a $-CH=CH_2$ group.

*Analysis.*—Calcd. for $C_4H_3F_6N$: F, 63.8%. Found: F, 64.04%.

EXAMPLE 3

*Preparation of N - (trifluorovinyl)bis(trifluoromethyl) amine and N-(2-chloro-1,2-difluorovinyl)bis (trifluoromethyl)amine*

A. A mixture of 53 g. of N-chlorobis(trifluoromethyl)amine and 28 g. of trifluoroethylene is placed in a glass reaction vessel fitted with a reflux condenser cooled by solid carbon dioxide. The reaction mixture is irradiated with an external ultraviolet light source for 22 hours. At the end of the irradiation period the volatile material is allowed to escape and the colorless liquid remaining in the reaction vessel is distilled. There is obtained 38 g. (50% conversion) of the 1:1 adduct boiling at 54–59° C. Gas chromatography of this product shows two principal peaks at 10.9 min. (84 area percent) and at 12.45 min. (14 area percent) for the two isomers.

(A) and $(CF_3)_2NCF_2-CHFCl$ (B), respectively. The two-peak mixture is isolated on a 2.3 g. scale by preparative gas chromatography for analysis. The fluorine nuclear magnetic resonance spectrum shows resonances at −655 and at −570 c.p.s. ($CF_3$) and at +40 c.p.s. (complex multiplet, $CF_2Cl$) and at +5,530 c.p.s. (complex multiplet, CFH) from sym. difluorotetrachloroethane as reference. The proton nuclear magnetic resonance spectrum shows a doublet split into triplets consistent with $-CFHCF_2-$. The nuclear magnetic resonance spectra indicate that isomer A, $(CF_3)_2NCFHCF_2Cl$, predominates.

*Analysis.* — Calcd. for $C_4HF_9NCl$: F, 63.5%; Cl, 13.15%; mol. wt., 270. Found: F, 64.03%; Cl, 13.55%; mol. wt., 273, 284 (freezing point in benzene).

B. A glass reaction vessel is equipped with a mechanical stirrer, a thermometer and a reflux condenser arranged for control of the cooling water temperature at 32–34° C. and the upper end of the condenser is attached to a trap cooled by solid carbon dioxide. The reaction vessel is charged with 100 ml. of methylcyclohexane and 27 g. of a mixture of N-(chlorotrifluoroethyl)bis(trifluoromethyl)-amines (prepared as described above). To the stirred mixture at 25° C. is added cautiously in three portions 32 g. of powdered potassium hydroxide which has previously been ground in a mortar under an atmosphere of nitrogen. There is no evidence of reaction during the addition. The resulting slurry is stirred and heated on a steam bath over a one-hour period to 72° C., at which time active refluxing occurs and 1.3 ml. of volatile material collects in the trap. Stirring and heating are continued at 72–88° C. for a period of 2 hours during which a total of 10 ml. of volatile material collects in the trap. Distillation of the volatile product through a spinning band fractionating column gives a central fraction, B.P. 17–18° C., of N - (trifluorovinyl)bis(trifluoromethyl) amine, amounting to 9 g. (39% conversion). Additional material in the boiling range 17–26° C. amounts to 4 g. (21% conversion), making a total conversion of 60%. Analytical gas chromatography indicates the larger fraction to contain one major component (approximately 99 area percent). The infrared absorption spectrum and the fluorine nuclear magnetic resonance spectrum show the product to be N - (trifluorovinyl)bis(trifluoromethyl) amine.

*Analysis.*—Calcd. for $C_4F_9N$: F, 73.4%. Found: F, 73.36%.

The procedure described in the preceding paragraph repeated two more times with a total of 128 g. of the mixture of N - (chlorotrifluoroethyl)bis(trifluoromethyl) amine isomers gives a total of 59 g. (55% conversion) of N - (trifluorovinyl)bis(trifluoromethyl)amine. There is also obtained a higher boiling fraction amounting to 5.3 g., B.P. 25–53° C. (principally 38–40° C.). Preparative gas chromatography of this fraction yields a co-product identified by infrared and nuclear magnetic resonance spectroscopy as N-(2-chloro-1,2-difluorovinyl)bis(trifluoromethyl)amine.

*Analysis.*—Calcd. for $C_4F_8NCl$: F, 61.0%. Found: F, 58.2%.

This product results from the removal of the elements of HF from the minor component of the starting mixture, i.e., N-(2-chloro-1,2,2-trifluoroethyl)bis(trifluoromethyl)amine.

EXAMPLE 4

*Preparation of N-(2,2-difluorovinyl)bis(trifluoromethyl) amine and N-(1,2-difluorovinyl)bis (trifluoromethyl)amine*

A mixture of N-(chlorotrifluoroethyl)bis(trifluoromethyl)amine isomers prepared as described in Example 3(A) is pyrolyzed over nickel gauze at 550° C. by the procedure described in Example 1(B). Two products are obtained in the gas chromatographic column at 3.4 min. (3 parts) and at 4.2 min. (1 part) retention time. Mass spectrometric analyses of the products indicate them to have the composition $(CF_3)_2NC_2HF_2$, and they are N-(2,2-difluorovinyl)bis(trifluoromethyl)amine and N-(1,2-difluorovinyl)bis(trifluoromethyl)amine.

EXAMPLE 5

*Preparation of N-(2-chlorovinyl)bis(trifluoromethyl) amine*

A mixture of 35 g. of N-chlorobis(trifluoromethyl)amine and 5.0 g. of acetylene is heated in a closed reaction vessel capable of withstanding high pressures at 175° C. for 5 hours, during which time the autogenous pressure drops from 600 to 325 lb./sq. in. Another mixture of the same reactants in the same proportion is heated similarly during which the autogenous pressure drops from 700 to 490 lb./sq. in. The combined liquid reaction products from both these runs amounts to 50 g. of a fluid, yellow liquid. Distillation of this crude product gives 20 g. (27% conversion) of the 1:1 adduct, N-(2-chlorovinyl)bis(trifluoromethyl)amine, boiling at 50–62° C. Preparative scale gas chromatographic separation of this distilled product yields the two cis and trans isomers, the major one having the shorter retention time. The fluorine nuclear magnetic resonance spectra for both isomers show the presence of $CF_3$. The major isomer shows absorption at 3.24 microns (=CH) and at 6.10 microns (C=C).

*Analysis.* — Calcd. for $C_4H_2F_6ClN$: F, 53.5%; Cl, 16.6%. Found: major isomer, F, 53.71%; Cl, 17.5%, 18.6%; minor isomer, F, 53.0%.

EXAMPLE 6

*Preparation of N-(2-chlorovinyl)bis(trifluoromethyl) amine*

A. A liquid mixture of 19 g. of vinyl chloride and 55 g. of N-chlorobis(trifluoromethyl)amine in a quartz reactor is stirred under reflux (the condenser cooled with solid carbon dioxide) and irradiated for 5 hours by means of an external coiled mercury ultraviolet lamp. During the early period of irradiation the mixture refluxes actively and after 45 minutes the refluxing essentially ceases. At the end of the five hours, the liquid product, amounting to 72 g., is distilled and there is obtained 67 g. of N-(2,2-dichloroethyl)bis(trifluoromethyl)amine (92% conversion), boiling at 91–96° C. The fluorine nuclear magnetic resonance spectrum shows a single fluorine resonance for $CF_3$ and the proton nuclear magnetic resonance spectrum shows a small triplet resonance for CH and a larger doublet resonance for $CH_2$, which show the structure to be $(CF_3)_2NCH_2CHCl_2$.

*Analysis.*—Calcd. for $C_4H_3Cl_2F_6N$: F, 45.7%; Cl 28.6%. Found: F, 45.33%; Cl, 28.55%.

B. A mixture of 25 g. of N-(2,2-dichloroethyl)bis(trifluoromethyl)amine and 45 g. of anhydrous potassium acetate in 75 ml. of N,N-dimethylformamide is stirred and heated with a fractionating column arranged for removal of distillate. During two hours there is collected a forerun of 2.16 g. boiling at 36–52° C. and then 17.7 g. of distillate boiling at 52–59° C. The latter is washed with dilute aqueous hydrochloric acid, with water, dried over anhydrous sodium sulfate and redistilled. There is obtained 14.8 g. of colorless distillate (70% conversion), B.P. 56–65° C., identified by means of infrared and nuclear magnetic resonance spectra and by gas chromatographic retention times as N-(2-chlorovinyl)bis(trifluoromethyl)amine (cis and trans isomers).

EXAMPLE 7

A. *Preparation of N-ethynylbis(trifluoromethyl)amine*

A mixture of 16 g. of N-(2-chlorovinyl)bis(trifluoromethyl)amine (mixed isomers), 100 ml. of methylcyclohexane and 60 g. of micropulverized potassium hydroxide is stirred and heated under reflux with provision for collecting volatile reaction products in a trap cooled with a solid carbon dioxide-acetone mixture. After 6 hours of refluxing there is obtained 6.4 ml. of volatile product in the cold trap. A duplication of this reaction gives another 5.9 ml. of volatile reaction product. The two products are combined and subjected to fractional distillation. There is obtained a central fraction boiling at 3.5° C. of N-ethynylbis(trifluoromethyl)amine amounting to 7 g.

*Analysis.*—Calcd. for $C_4HF_6N$: F, 64.3%. Found: F, 64.96, 64.80%.

The structure is confirmed by infrared and nuclear magnetic resonance spectroscopy. Infrared bands are present at 3.0μ (≡CH), 4.6μ (—C≡C—) and at 7.9μ (CF, strong). The fluorine n-m-r spectrum shows a peak for $CF_3$ at −295 c.p.s. from sym.-difluorotetrachloroethane reference, and the proton n-m-r spectrum shows a single resonance for C≡CH at −130 c.p.s. from tetramethylsilane reference. An additional portion obtained in the distillation having a boiling range of 0 to 9° C. amounts to 10.5 g. The total amount of N-ethynylbis (trifluoromethyl)amine obtained amounts to 17.5 g. (60% conversion).

B. *Preparation of N,N,N',N'-tetrakis(trifluoromethyl)-1-chloro-1,2-(and 2,2)ethenediamines*

A test tube-shaped quartz reactor of 250 ml. capacity connected to an open end manometer and provided with an external coiled mercury resonance lamp is evacuated and charged with 1 g. of N-ethynylbis(trifluoromethylamine) (pressure increment 300 mm.) and then 1 g. of N-chlorobis(trifluoromethyl)amine (pressure increment 303 mm.). The reactor is shielded and the mercury resonance lamp turned on for one minutes. This results in a decrease of pressure in the reactor and the formation of colorless liquid in the bottom of the vessel. The irridiation is continued for two 1-minute periods and then for two 2-minute periods with 1-minute dark periods between each irradiation.

The above reaction is repeated using a 500 ml. capacity reactor to which is charged 1.5 g. of N-ethynyl (trifluoromethyl)amine and 2 g. of N-chlorobis(trifluoromethylamine. After irradiation in a manner similar to that described above there is a pressure decrease in the reactor and a liquid product forms. The liquid products from both experiments (amounting to 3.1 ml., or 4.9 g., combined) are distilled and there is obtained 1.8 ml. of colorless liquid boiling at 92–95° C. The following data show this product to be a mixture of isomers formed by combination of one molecule of each reactant, namely, N,N,N',N'-tetrakis(trifluoromethyl)-1-chloro-1,2-ethenediamine (cis and trans) and N,N,N',N'-tetrakis(trifluoromethyl)-1-chloro-2,2-ethenediamine. The infrared absorption spectrum shows bands at 3.25 microns (=CH), at 6.01 microns (C=C) and strong absorption at 7–9 microns (CF). The fluorine nuclear magnetic resonance spectrum shows $CF_3$ resonances and the proton nuclear magnetic resonance spectrum shows a resonance at −380 to −400 c.p.s. (from tetramethylsilane reference, 60 mc.)

with complex splitting. Analytical scale gas chromatography shows the presence of two major components.

*Analysis.*—Calcd. for $C_6F_{12}N_2ClH$: F, 62.5%; N, 7.7%. Found: F, 63.42%; N, 7.83%.

EXAMPLE 8

*Preparation of N-ethynylbis(trifluoromethyl)amine*

A mixture of 39 g. of N-(2,2-dichloroethyl)bis(trifluoromethyl)amine and 100 g. of micropulverized potassium hydroxide in 150 ml. of methylcyclohexane is heated under the conditions described in Example 7–A above. After 21 hours reaction there is obtained 13.5 ml. of volatile product. Distillation of this product gives 10.5 g. of N-ethynylbis(trifluoromethyl)amine (47% conversion), B.P. 3–4° C.

EXAMPLE 9

*Polymerization of N-vinylbis(trifluoromethyl)amine*

A mixture of 2 g. of N-vinylbis(trifluoromethyl)amine and 5.8 milligrams of dinitrogen difluoride in a sealed platinum tube is heated for 6 hours at 50–60° C. under 3,000 atm. pressure. There is obtained 1.83 g. of colorless, solid polymer. This polymer is insoluble in hot N,N-dimethylformamide or hot toluene and is not affected by cold concentrated sulfuric or nitric acid, or by n-butylamine at its boiling point. The polymer is molded at 100–150° C. to a stiff, clear, transparent, tough, self-supporting film.

EXAMPLE 10

*Preparation of a copolymer of N-(trifluorovinyl)bis-(trifluoromethyl)amine and ethylene*

A mixture of approximately 2.8 g. of N-(trifluorovinyl)bis(trifluoromethyl)amine, 0.3 g. of ethylene and 6 mg. of dinitrogen difluoride (all measured as gases at 1 atm., 300 cc., 300 cc., and 2 cc. volumes, respectively) is placed in a platinum tube at liquid nitrogen temperature. The tube is sealed and the mixture is then heated with shaking at 60° C. for four hours under 3000 atm. pressure. On opening the tube a volatile liquid is evolved and there remains 0.4 g. of white, solid copolymer of ethylene and N-(trifluorovinyl)bis(trifluoromethyl)amine. This polymer is pressed at 50–90° C. into films that are transparent and elastic. The film shows infrared absorption bands at $3.4\mu$ (CH) and strong absorption at $7-9\mu$ (CF). The polymer is insoluble in hot xylene. The copolymer contains 53.57% F and 4.74% N.

EXAMPLE 11

*Preparation of a copolymer of N-vinylbis(trifluoromethyl)amine and tetrafluoroethylene*

By the procedure of Example 10, a mixture of 2.0 ml. of liquid perfluorodimethylcyclobutane and 2 g. of N-vinylbis(trifluoromethyl)amine, 1.3 g. of tetrafluoroethylene, and 6 mg. of dinitrogen difluoride is heated at 60° C. and 3000 atm. pressure for 4 hours. There is obtained a white, tacky polymer which on drying in vacuum, cutting into small pieces and further drying at 100° C. in vacuum to constant weight gives 3.23 g. of white, tough, horny solid copolymer of N-vinylbis(trifluoromethyl)amine and tetrafluoroethylene. The copolymer contains 5.11% N. The copolymer is pressed into clear, colorless, flexible, transparent films at 140–180° C. The copolymer film shows infrared absorption at $3.3\mu$ (CH) and strong absorption at $7-10\mu$ (CF). Films are manually drawn cold, or when warm, to the extent of several times the original length.

EXAMPLE 12

*Preparation of a copolymer of N-vinylbis(trifluoromethyl)amine and tetrafluoroethylene*

An 80 ml. stainless steel shaker tube is flushed with nitrogen and there are added 15 ml. of perfluorodimethylcyclobutane as solvent and 0.1 g. of α,α-azobis(α-cyclopropylpropionitrile) and the reactor is closed and cooled promptly in a bath of acetone and solid carbon dioxide. The vessel is evacuated and charged in a barricaded area with 6 g. of N-vinylbis(trifluoromethyl)amine and 50 g. of tetrafluoroethylene. The closed reactor is then heated with shaking at 35–40° C. for 15 hours. At the end of this time the volatile material in the reactor is bled through a trap cooled with solid carbon dioxide, and on opening the reactor there is obtained 10 g. of a colorless, syrupy, slurry of polymer. Additional perfluorodimethylcyclobutane is added and the resulting polymer solution is filtered through a fluted filter paper. The faintly turbid filtrate is concentrated to dryness under reduced pressure in a glass flask. The polymer deposits as a film on the walls of the flask and, after drying to constant weight in a vacuum on a steam bath, it amounts to 1.65 g. This tough, faintly tan-colored copolymer is extracted with boiling benzene under reflux for 15 minutes and then vacuum dried. The tough polymer mass is cut up into small pieces and further dried in vacuum on a steam bath. There is obtained 1.51 g. of polymer. This copolymer contains 4.32% nitrogen and 69.66% fluorine. The copolymer is pressed at 130–160° C. into clear, colorless, transparent, flexible films of 0.5 to 1.8 mil thickness. These films can be cold drawn with necking down. Infrared absorption spectra of the films show absorption at 3.3 microns (CH) and strong absorption in the 7–9 micron region (CF). The proton nuclear magnetic resonance spectrum of the polymer in perfluorodimethylcyclobutane solution shows two broad resonances centered at −2.5 p.p.m. (relative size about 2) and at −4.6 p.p.m. (relative size about 1) (tetramethylsilane reference).

EXAMPLE 13

*Preparation of a copolymer of N-(trifluorovinyl)bis(trifluoromethyl)amine and vinylidene fluoride*

By the procedure of Example 10 a mixture of 2 ml. of perfluorodimethylcyclobutane, 0.8 g. of vinylidene fluoride, 3.3 g. of N-(trifluorovinyl)bis(trifluoromethyl)amine and about 6 mg. of dinitrogen difluoride is heated at 60° C. and 3000 atm. pressure for 2 hours. There is obtained 0.36 g. of white, solid copolymer of N-(trifluorovinyl)bis(trifluoromethyl)amine and vinylidene fluoride. The polymer is pressed to form clear, colorless, transparent, flexible films at 105–175° C. The film of copolymer can be manually cold drawn. The copolymer contains 1.48% nitrogen and 61.00% fluorine.

EXAMPLE 14

*Polymerization of N-ethynylbis(trifluoromethyl)amine*

A mixture of 3.0 g. of N-ethynylbis(trifluoromethyl)amine, 0.021 g. of triphenylphosphine-nickel tricarbonyl catalyst and 1.0 ml. of benzene is sealed in a "Pyrex" glass tube and kept at room temperature (25°–30° C.) under autogenous pressure with occasional agitation. The initially clear homogeneous solution gradually turns light yellow in color (5 minutes), then turns to a darker greenish-yellow color (25 minutes). After about 35 minutes a slight evolution of heat is noted and after 55 minutes the mixture evolves additional heat and deposits a mass of solid polymer. After cooling, the tube is opened and the solid polymer is extracted repeatedly with hot benzene and dried in vacuum. There is obtained 1.2 g. of brown, solid polymer. This polymer is insoluble in concentrated sulfuric acid at 100° C., and in the following solvents heated to the boiling point: pyridine, N,N-dimethylformamide, methyl ethyl ketone, glacial acetic acid, dimethyl sulfoxide, and aqueous sodium hydroxide. The polymer is pressed at 170–180° C. under a pressure of 500 lb./sq. in. to form self-supporting, flexible, transparent films of 0.5 to 2 mils thickness that are orange-red in color. Remolding gives films of increased clarity. Infrared examination of the polymer as a film or as a potassium bromide mull shows absorption at 3.0 microns (=CH), at 6–6.5 microns (C=C), and strong absorption at 7–9 microns (CF). The visible spectrum shows strong absorption near 450–500 millimicrons with increasing strength of absorption at shorter wave lengths.

*Analysis.*—Calcd. for $C_4HF_6N$: C, 27.2%; H, 0.6%; F, 64.3%; N, 7.9%. Found: C, 28.83%; H, 0.93%; F, 63.12%; N, 7.99%.

The examples have illustrated the products of this invention by reference to the preparation of specific compounds covered by the general formula given hereinbefore. Other specific N,N-bis(perfluoroalkyl)aminoethylenes that are included by this invention and which can be made by the procedures illustrated by the examples include the compounds listed in the right-hand column of the following Table I. The starting materials from which they are prepared are listed in the first column of the table.

TABLE I.—PREPARATION OF N,N-BIS(PERFLUOROALKYL) AMINOETHYLENES

| Starting Materials | | Products |
| --- | --- | --- |
| $CF_3CF_2-N(CF_3)-Cl$ | $HCF=CF_2$ | $CF_3CF_2-N(CF_3)-CF=CF_2$ |
| $CF_3CF_2-N(CF_3)-Cl$ | $CH\equiv CH$ | $CF_3CF_2-N(CF_3)-CH=CHCl$ |
| $CF_3CF_2CF_2CF_2-N(CF_3)-Cl$ | $CH_2=CH_2$ | $CF_3CF_2CF_2CF_2-N(CF_3)-CH=CH_2$ |
| $CF_3CF_2CF_2CF_2-N(CF_3)-Cl$ | $HCF=CF_2$ | $CF_3CF_2CF_2CF_2-N(CF_3)-CF=CF_2$ |
| $(CF_3CF_2CF_2)_2N-Cl$ | $CH_2=CH_2$ | $(CF_3CF_2CF_2)_2N-CH=CH_2$ |
| $(CF_3CF_2CF_2)_2N-Cl$ | $HCF=CF_2$ | $(CF_3CF_2CF_2)_2N-CF=CF_2$ |
| $(CF_3CF_2CF_2)_2N-Cl$ | $CH\equiv CH$ | $(CF_3CF_2CF_2)_2N-CH=CHCl$ |
| $(CF_3)_2CF-N(CF_3)-Cl$ | $CH_2=CH_2$ | $(CF_3)_2CF-N(CF_3)-CH=CH_2$ |
| $[CF_3(CF_2)_3]_2-N-Cl$ | $CH_2=CH_2$ | $[CF_3(CF_2)_3]_2N-CH=CH_2$ |

In addition to the N-ethynylbis(trifluoromethyl)amine of Examples 7A and 8, other N-ethynylbis(perfluoroalkyl)amines can be prepared by the processes of these two examples, and specific examples of such amines are listed in Table II, together with the starting materials from which they are prepared.

TABLE II.—PREPARATION OF N-ETHYNYLBIS (PERFLUOROALKYL)AMINES

| Starting Materials | Products |
| --- | --- |
| $CF_3CF_2-N(CF_3)-CH=CHCl$ | $CF_3CF_2-N(CF_3)-C\equiv CH$ |
| $(CF_3CF_2CF_2)_2N-CH=CHCl$ | $(CF_3CF_2CF_2)_2N-C\equiv CH$ |

The monomeric N,N-bis(perfluoroalkyl)aminoethylenes of this invention are useful for the formation of polymers, both homopolymers and copolymers with one or more other polymerizable ethylenically unsaturated compounds. The resulting polymers and copolymers are useful for various purposes. For example, they can be molded into rigid articles of various shapes and into self-supporting films and sheets by conventional molding procedures.

The liquid products of this invention are useful as solvents, e.g., for dissolving fluorinated polymers in the treatment of cellulosic materials to impart to them waterproofing properties. For example, a sample of filter paper is immersed in a solution of 1 part of a low-melting polytetrafluoroethylene in 8 parts of warm N-(2-chlorovinyl)bis(trifluoromethyl)amine (prepared as described in Example 5) and a separate piece of paper is immersed in a similar solution of 1 part of the polytetrafluoroethylene in 8 parts of warm N,N,N',N'-tetrakis(trifluoromethyl)-1-chloro-1,2-(or 2,2-)ethenediamine (prepared as described in Example 7-B). After drying in air to remove solvent, the treated paper samples are highly resistant to wetting by water, which remains as droplets on the treated zone, whereas portions of the same paper that are not treated or are treated with the pure solvents are readily wetted by water to become limp.

Since obvious modifications and equivalents in the invention will be evident to those skilled in the chemical arts, I propose to be bound solely by the appended claims.

The embodiments of the invention in which an exclusive property or privilege is claimed are defined as follows:

1. N,N-bis(perfluoroalkyl)aminoethylenes of the general formula $(R_f)_2NCX'=CXX'$ wherein $R_f$ is perfluoroalkyl of up to 6 carbons, X is selected from the group consisting of hydrogen and fluorine and X' is selected from the group consisting of hydrogen, fluorine, chlorine and $(R_f)_2N-$, with the provisos that the two $R_f$ substituents and the two X' substituents need not be, respectively, the same, and that not more than one X' is $(R_f)_2N-$.

2. N-vinylbis(trifluoromethyl)amine.

3. N-(trifluorovinyl)bis(trifluoromethyl)amine.

4. N - (2 - chloro - 1,2 - difluorovinyl)bis(trifluoromethyl)amine.

5. N-(2,2-difluorovinyl)bis(trifluoromethyl)amine.

6. N-(1,2-difluorovinyl)bis(trifluoromethyl)amine.

7. N-(2-chlorovinyl)bis(trifluoromethyl)amine.

8. N-ethynylbis(trifluoromethyl)amine.

9. N,N,N',N' - tetrakis(trifluoromethyl) - 1 - chloro-1,2-ethenediamine.

10. N,N,N',N' - tetrakis(trifluoromethyl) - 1 - chloro-2,2-ethenediamine.

11. A solid, addition polymer of a compound of claim 1.

12. A solid, addition polymer of N-vinylbis(trifluoromethyl)amine.

13. A solid, addition homopolymer of N-vinylbis(trifluoromethyl)amine.

14. A solid, addition copolymer of N-vinylbis(trifluoromethyl)amine.

15. A solid, addition copolymer of N-vinylbis(trifluoromethyl)amine and tetrafluoroethylene.

16. A solid, addition polymer of N-(trifluorovinyl)bis-(trifluoromethyl)amine.

17. A solid, addition copolymer of N-(trifluorovinyl)bis(trifluoromethyl)amine.

18. A solid, addition copolymer of N-(trifluorovinyl)bis(trifluoromethyl)amine and ethylene.

19. A solid, addition copolymer of N-(trifluorovinyl)bis(trifluoromethyl)amine and vinylidene fluoride.

20. A solid, addition polymer of N-ethynylbis(trifluoromethyl)amine.

No references cited.

JOSEPH L. SCHOFER, *Primary Examiner.*

H. WONG, *Examiner.*

J. A. DONAHUE, *Assistant Examiner.*